(12) United States Patent
Choi et al.

(10) Patent No.: US 8,163,258 B2
(45) Date of Patent: Apr. 24, 2012

(54) PYROMETALLURGICAL PROCESS FOR TREATING MOLYBDENITE CONTAINING LEAD SULFIDE

(75) Inventors: Young-Yoon Choi, Daejeon (KR); Sang-Bae Kim, Daejeon (KR); Byung-Su Kim, Kunsan (KR); Hoo-In Lee, Daejeon (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 238 days.

(21) Appl. No.: 12/621,456

(22) Filed: Nov. 18, 2009

(65) Prior Publication Data

US 2011/0081283 A1 Apr. 7, 2011

(30) Foreign Application Priority Data

Oct. 5, 2009 (KR) .......................... 10-2009-0094193

(51) Int. Cl.
*C22B 1/00* (2006.01)
(52) U.S. Cl. .............. 423/59; 423/88; 423/97; 423/107; 423/108; 423/135; 423/149
(58) Field of Classification Search .................. 423/59, 423/88, 97, 107, 108, 135, 149
See application file for complete search history.

(56) References Cited

U.S. PATENT DOCUMENTS

| | | | | |
|---|---|---|---|---|
| 1,606,343 | A | * 11/1926 | Burdick | 423/59 |
| 3,020,151 | A | * 2/1962 | Nachtman et al. | 75/623 |
| 3,969,106 | A | 7/1976 | Wark | |
| 4,082,629 | A | 4/1978 | Milner et al. | |
| 4,092,152 | A | * 5/1978 | Borbely | 75/748 |
| 4,312,724 | A | 1/1982 | Kammel et al. | |
| 5,439,115 | A | 8/1995 | Beyzavi et al. | |

OTHER PUBLICATIONS

Notice of Allowance dated May 14, 2010 of the corresponding Korean Patent Application No. 10-2009-0094193.
Lee, et al., "Non-iron Metal Manufacturing Engineering," Jan. 25, 1999, Moon Woon Dang, pp. 81-88 and English translation.
English translation of KIPO Office action dated May 14, 2010 for Korean Priority Patent Application No. 10-2009-0094193, cited in an IDS on Dec. 13, 2011 (erroneously listed as a Notice of Allowance), 2 pages.

* cited by examiner

*Primary Examiner* — Steven Bos
(74) *Attorney, Agent, or Firm* — Christie, Parker & Hale, LLP

(57) ABSTRACT

A method of removing lead sulfide contained in refined molybdenite powder concentrates (major component; $MoS_2$) is provided. More specifically, in order to solve the problems associated with a leaching method using a leaching agent that is employed for conventional hydrometallurgical process, oxygen-free inert gas is circulated in a furnace for pyrometallurgical treatment to evaporate lead sulfide at high temperature, followed by condensing process to recover lead sulfide at low temperature. The method is characterized in that, it can reduce environmental contamination and can easily recover sulfides of valuable metals such as lead, indium, zinc and the like.

3 Claims, 2 Drawing Sheets

A: Sample boat, B: Thermocouple, C: Tube furnace, D: Gas tank,

E: Flow controller, F: Temperature controller, G: Flask, H: Washing liquid

PYROMETALLURGICAL PROCESS FOR TREATING MOLYBDENITE CONTAINING LEAD SULFIDE

CROSS-REFERENCE TO RELATED APPLICATIONS

This application claims priority to and the benefit of Korean Patent Application No. 10-2009-0094193 filed in the Korean Intellectual Property Office on Oct. 5, 2009, the entire content of which is incorporated herein by reference.

DETAILED DESCRIPTION OF THE INVENTION

1. Technical Field

The present invention relates to a method of removing and recovering lead sulfide (PbS) that is contained in low-grade molybdenite. More specifically, it is related to a method of removing lead sulfide comprising steps of treating low-grade molybdenite concentrates under an oxygen-free atmosphere at high temperature and removing volatile sulfides of lead, indium, zinc, bismuth and the like by evaporation while maintaining molybdenite.

2. Background Art

Molybdenum (Mo) is one of the most important metal elements that are used for improving strength of alloy steel, used as a catalyst for a chemical reaction, i.e., hydrogenation, and as a trace element for growing a plant in agricultural field. It is a relatively noble element that is not naturally obtained in the free form. Economically feasible primary source of molybdenum is molybdenite ($MoS_2$). However, concentration of the molybdenite contained in metal ores is relatively low, i.e., about 0.05% by weight to 0.1% by weight. Further, molybdenite is mostly found in a limited number of countries including China, U.S.A., Chile, etc., and absolute amount present on the surface of the earth is small. For such reasons, molybdenite with high quality is hard to find and gradually run out around the world. Thus, recycle of molybdenum scrap or use of low-grade ores is very much required.

Meanwhile, in low-grade molybdenite, it is likely that metals such as lead, bismuth, indium and the like are also comprised. Lead may cause problems including corrosion of a refractory for a steel alloy process, deterioration in quality of steel product, and environmental contamination due to evaporation, etc. Molybdenum oxide for industrial use that is used in a steel industry (i.e., tech. grade $MoO_3$) is regulated to have lead content under the specific level (i.e., from 0.05 to 0.5% by weight). Thus, when molybdenum oxide for industrial use is prepared from low-grade molybdenite comprising lead, it is very important to develop a method that can be used for efficient removal of lead.

There are two major conventional methods of removing lead sulfide from metal ore concentrates, i.e., a physical method and a chemical method. The most representative example of physical methods is to separate and select lead sulfide based on a floatation process, and it can be used only when lead sulfide is well liberated as an element in the pyrite form. Ali-Naghi Beyzavi and others developed a method for selective floatation of metal sulfides by controlling air flow during floatation process and controlling pH and oxidation/reduction potential using $SO_2$ and $Ca(OH)_2$ (see, U.S. Pat. No. 5,439,115, Process for Selective Flotation of Copper Lead Zinc Sulfide). Chulhyun Park and others reported that, by using sodium dichromate ($Na_2Cr_2O_7$) as an inhibiting agent for floatation of molybdenum comprising PbS, a significant amount of PbS can be reduced (see, Spring 2009 Academic Articles published by The Korean Institute of Resources Recycling). However, PbS removal based on floatation is problematic in that not only the floatation agent ($Na_2Cr_2O_7$, etc.) that is used as an inhibiting agent may cause a significant environmental contamination but also it can inhibit flotation of molybdenite, and therefore loss of molybdenum is inevitable.

As a method of chemically removing PbS, there is a hydrometallurgical method. Specifically, William John Wark reported a process of removing lead sulfide comprising steps of treating complex ores containing lead sulfide in a sulfuric acid solution to selectively oxidize lead sulfide chlorite to lead sulfate, and leaching it with brine for the removal (see, U.S. Pat. No. 3,969,106, Selective Hydrometallurgical Separation of Lead from Complex Lead-Zinc-Copper Sulfide Ores or Derived Concentrates). In addition, a method of recovering metallic lead comprising steps of selectively leaching Pb from sulfide ores comprising PbS by using ferric chloride ($FeCl_3$) to obtain $PbCl_2$, and recovering the metallic lead via molten salt electrolysis (see, U.S. Pat. No. 4,082,629 by Edward F. G., et. al., Hydrometallurgical Process for Treating Metal Sulfides Containing Lead Sulfide, and U.S. Pat. No. 4,312,724 by Ronald Kammel, et. al., Method for the Recovery of Lead from Materials Containing Lead Sulfide) has been also reported. However, since most of the PbS removal method based on a hydrometallurgical process involves dissolving Pb in water for removal, waste water comprising Pb is generated, and therefore has a huge environmental problem.

PROBLEMS TO BE SOLVED BY THE INVENTION

The present invention is devised to solve the problems described in the above, and object of the invention is to provide a method for the selective removal of volatile metal sulfide compounds including lead sulfide that are present in low-grade molybdenite.

MEANS FOR SOLVING THE PROBLEMS

Figure 1:
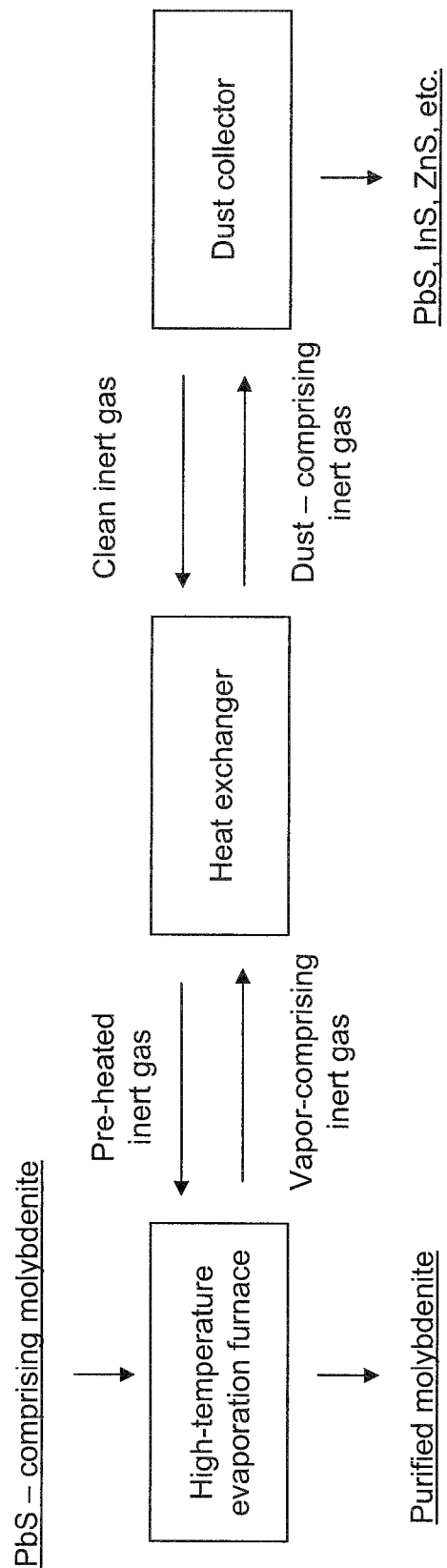
FIG. 1 is a process flow diagram illustrating the method of the present invention.

The present invention is to provide a method of removing volatile metal sulfides from molybdenite comprising them, comprising steps of bringing the molybdenite comprising volatile metal sulfides into contact with an inert gas in a high-temperature evaporation furnace to volatilize the volatile metal sulfides, and cooling the vapor-comprising gas to remove and recover the volatile metal sulfides.

The present invention is to provide a method of removing and recovering volatile metal sulfides in which the volatile metal sulfides are any one of lead, indium and zinc.

The present invention is to provide a method of removing and recovering volatile metal sulfides in which the inert gas may comprise any one of nitrogen ($N_2$), argon (Ar), carbon dioxide ($CO_2$) and methane ($CH_4$), or a mixed gas thereof.

The present invention is to provide a method of removing and recovering volatile metal sulfides in which temperature of the high-temperature evaporation furnace is in the range of 850° C. to 1,100° C.

Finally, the present invention is to provide a method of removing and recovering volatile metal sulfides in which temperature of the high-temperature evaporation furnace is in the range of 1,000° C. to 1,100° C.

EFFECT OF THE INVENTION

The method of the present invention is advantageous in that, by selectively condensing and removing volatile metal sulfides, an environmental contamination problem is avoided compared to conventional processes and valuable resources like lead sulfide (PbS), indium sulfide (InS), zinc sulfide (ZnS) and the like can be easily recovered and used again.

MODE FOR CARRYING OUT THE INVENTION

Primary source of molybdenum is molybdenite ($MoS_2$). When molybdenite is exposed to an air at the temperature of 300° C. or higher, it is oxidized according to the following reaction and converted into molybdenum oxide ($MoO_3$).

$$MoS_2 + 7/2 O_2 \rightarrow MoO_3 + 2 SO_2 \quad (1)$$

Molybdenum oxide ($MoO_3$) is used in the form of powder or briquette as a source for manufacturing steel alloy. Or, as a chemical catalyst, a pigment or a reacting material for producing other metal product, it is first purified to high level via dry- or hydrometallurgical process and then used.

When lead sulfide is present as an impurity in molybdenite, it can be also oxidized to lead oxide (PbO), followed by combination between lead oxide as a basic oxide and molybdenum oxide as an acidic oxide to give the secondary salt, i.e., lead molybdate, as follows.

$$MoO_3 + PbO \rightarrow PbMoO_4 \quad (2)$$

Lead molybdate usually remains in residuals of a dry- or hydrometallurgical process, consequently making it difficult to selectively recover molybdenum.

As it is shown in the chemical reaction formulae (1) and (2) above, in the presence of oxygen, molybdenite converts into molybdenum oxide ($MoO_3$) or molybdate salt at the temperature of 300° C. or higher. Molybdenum oxide sublimes at the temperature of 600° C. or higher, and therefore has significant vapor pressure. On the other hand, $MoS_2$ does not sublime, and therefore has no vapor pressure.

Since lead sulfide has significant vapor pressure at the temperature of 800° C. or higher compared to other metal sulfides, when molybdenite comprising lead sulfide is exposed to an oxygen-free gas at the temperature of 800° C. or higher, the lead sulfide will volatilize in an amount that corresponds to its vapor pressure. On the other hand, molybdenite ($MoS_2$) having no vapor pressure will remain in the ore.

TABLE 1

| Vapor pressure of lead sulfide (PbS) at different temperatures | | | | | | |
|---|---|---|---|---|---|---|
| Temperature (° C.) | 750 | 800 | 850 | 900 | 950 | 1,000 |
| Vapor pressure (mmHg) | 0.094 | 0.347 | 1.134 | 3.329 | 8.905 | 21.931 |

Meanwhile, if a high-temperature gas comprising lead sulfide is cooled after the separation from molybdenite, volatile sulfides such as lead sulfide and the like can be removed.

FIG. 1 is a process flow diagram illustrating the method of the present invention which consists of a high-temperature evaporation furnace in which efficient contact with inert oxygen-free inert gas can be made at high temperature, a heat exchanger in which high-temperature gas comprising lead sulfide and the like can be cooled and the inert gas from which lead dust, etc. is removed can be pre-heated, and a dust collector in which the lead dust condensed in the heat exchanger is removed and recovered. If the present invention is explained in greater detail in view of this process flow, molybdenite comprising PbS and the like is introduced to the high-temperature evaporation furnace to selectively evaporate PbS and the like. To achieve this, oxygen-free atmosphere which has extremely low oxygen pressure is required to prevent oxidation of $MoS_2$. In addition, efficient contact with the high-temperature gas that is present in a sufficient amount to allow complete evaporation of PbS and the like present in the ore should be made. With respect to a furnace system which can be used for obtaining efficient contact, a multiple hearth furnace, a mobile stoker furnace, a fluidizing furnace and the like are preferable.

As a parameter which decides successful removal and recovery of lead sulfide and the like while inhibiting volatilization of molybdenum, evaporation temperature, evaporation time, oxygen pressure, a flow amount, and a contact method all have an inter-related effect on each other. Thus, it can be said that obtaining an appropriate balance between them is a technical subject to achieve.

The present invention will be better understood in view of the following example. However, the examples are only to exemplify the present invention and can be modified to other various forms. It is clear that the present invention is not interpreted to be limited to the examples that are described in detail herein below.

EXAMPLES

The present invention having the constitution as described above can be implemented as follows in view of the attached FIG. 2.

Figure 2:
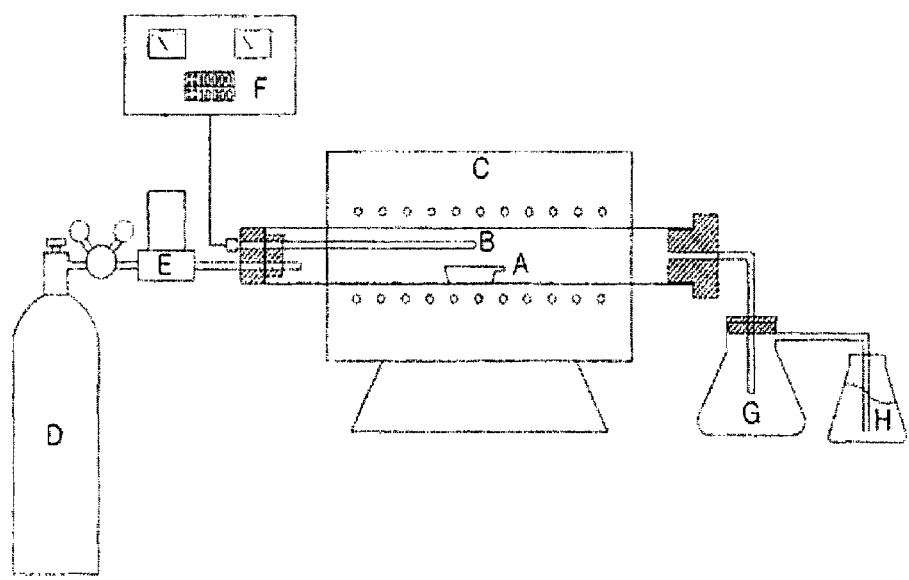
FIG. 2 is a diagram showing the constitution of the evaporating and condensing apparatus.

Using a tube furnace having an alumina tube with inner diameter of 4.2 cm and length of 100 cm, an evaporating and condensing apparatus is prepared as shown in FIG. 2.

A is a flat-bottom alumina boat which has width of 2 cm and length of 9 cm. B is an R type thermocouple. E is an electronic flow controller for nitrogen gas. G is a flask for collecting dust that is formed by condensation.

To the sample boat A, 5 g of molybdenite concentrates ($MoS_2$: 49.9%, S: 34.4%, Pb: 4.57%, Zn: 1.04%, In: 1.12%, Bi: 0.58%, and others including silica, etc.: 8.39%) was introduced by thinly spreading it with thickness of 1 to 2 mm or so on the bottom of the boat. After tightening the stopper, nitrogen gas was flowed through for 30 minutes with flow rate of 2 liters/minute to remove oxygen contained in the alumina tube. After increasing the temperature to the desired evaporation temperature with rate of 10° C./minute, it was maintained for a certain period time. The cooling process was then carried out and the chemical components comprised in the sample and collected materials were analyzed.

Results of the Analysis

Table 2 indicates the weight ratio of residues (i.e., residual ratio) and the content of Pb comprised in the residuals in the boat when the nitrogen gas flow rate was 2 liters/minute, the evaporation time was 10 minutes and the evaporation temperature was 850° C., 900° C., 950° C., 1,000° C., 1,050° C. or 1,100° C. As a result, it was found that when evaporation temperature was less than 850° C., vapor pressure of lead sulfide was low so that the evaporation hardly occurred. On the other hand, at the temperature of 1,100° C. or higher, good evaporation was obtained but it is economically unfavorable as it is expensive to maintain the high temperature. Thus, it was found that from 93.8% to 99.4% of Pb can be removed preferably at the temperature of between 1,000° C. and 1,100° C.

TABLE 2

Removal ratio of lead sulfide at different temperatures

| Temperature (° C.) | Pb content (%) | Residual ratio (%) | Pb removal ratio (%) | Others |
|---|---|---|---|---|
| 850 | 2.75 | 94.93 | 42.9 | |
| 900 | 1.72 | 93.72 | 64.7 | |
| 950 | 0.53 | 92.10 | 89.3 | |
| 1,000 | 0.31 | 91.50 | 93.8 | |
| 1,050 | 0.049 | 90.80 | 99.0 | |
| 1,100 | 0.032 | 89.98 | 99.4 | |

Table 3 shows the change in weight ratio of the residuals (i.e., residual ratio) and the change in the Pb content that is comprised in the residuals, when the nitrogen gas flow rate was 2 liters/minute, the evaporation temperature was 850° C., and the evaporation time was 10, 30, 60, or 120 minutes. It was found that, at the temperature as low as 850° C., a significant amount of PbS was removed.

TABLE 3

Removal ratio of lead sulfide according to lapse of time

| Time (minutes) | Pb content (%) | Residual ratio (%) | Removal ratio (%) | Others |
|---|---|---|---|---|
| 10 | 2.75 | 94.93 | 42.9 | |
| 30 | 2.29 | 93.72 | 53.0 | |
| 60 | 0.97 | 92.10 | 80.5 | |
| 120 | 0.81 | 91.50 | 83.8 | |

Table 4 shows the results of chemical analysis carried on the dust which had been collected at the evaporation temperature of 850° C. As a result of the chemical analysis and X-ray diffraction analysis, it was found that it was mostly pyrites, and indium and zinc, both are importantly used for the present information technology, were also recovered in a significant amount. This is because that, both indium and zinc have significant vapor pressure above the certain temperature like lead, and therefore they are removed according to the same mechanism as lead.

TABLE 4

| Composition of collected dust | | | | | |
|---|---|---|---|---|---|
| Pb | In | Bi | Zn | S | Total |
| 59.60 | 14.10 | 8.89 | 1.16 | 16.25 | 100% |

As demonstrated in the above example, by selectively condensing, removing and recovering the volatile metal sulfides, the method of present invention is advantageous in that, not only an environmental contamination problem can be avoided, but also valuable resources including PbS, InS, ZnS and the like can be easily recovered and used again.

What is claimed is:

1. A method of removing and recovering volatile metal sulfides from molybdenite ore comprising them, comprising steps of bringing the molybdenite ore comprising volatile metal sulfides into contact with an inert gas in a high-temperature evaporation furnace to volatilize the volatile metal sulfides to form a vapor-comprising gas, and cooling the vapor-comprising gas to remove and recover the volatile metal sulfides, in which the volatile metal sulfides are any one of lead, indium or zinc, and in which temperature of the high-temperature evaporation furnace is in the range of 1,000° C. to 1,100° C.

2. A method of removing and recovering volatile metal sulfides from molybdenite ore comprising them, comprising steps of bringing the molybdenite ore comprising volatile metal sulfides into contact with an inert gas in a high-temperature evaporation furnace to volatilize the volatile metal sulfides to form a vapor-comprising gas, and cooling the vapor-comprising gas to remove and recover the volatile metal sulfides, in which the inert gas comprises any one of nitrogen ($N_2$), argon (Ar), carbon dioxide ($CO_2$), methane ($CH_4$), or a mixed gas thereof, and in which temperature of the high-temperature evaporation furnace is in the range of 1,000° C. to 1,100° C.

3. A method of removing and recovering volatile metal sulfides from molybdenite ore comprising them, comprising steps of bringing the molybdenite ore comprising volatile metal sulfides into contact with an inert gas in a high-temperature evaporation furnace to volatilize the volatile metal sulfides to form a vapor-comprising gas, and cooling the vapor-comprising gas to remove and recover the volatile metal sulfides, and in which temperature of the high-temperature evaporation furnace is in the range of 1,000° C. to 1,100° C.

* * * * *